United States Patent
Neander et al.

(10) Patent No.: US 10,988,025 B2
(45) Date of Patent: Apr. 27, 2021

(54) ENERGY STORAGE ROBOT

(71) Applicant: ABB Schweiz AG, Baden (CH)

(72) Inventors: Jonas Neander, Västerås (SE); Krister Landernäs, Hallstahammar (SE); Linus Thrybom, Västerås (SE); Mikael Gidlund, Sundsvall (SE)

(73) Assignee: ABB SCHWEIZ AG, Baden (CH)

( * ) Notice: Subject to any disclaimer, the term of this patent is extended or adjusted under 35 U.S.C. 154(b) by 273 days.

(21) Appl. No.: 15/320,581

(22) PCT Filed: Jun. 17, 2015

(86) PCT No.: PCT/EP2015/063577
§ 371 (c)(1),
(2) Date: Dec. 20, 2016

(87) PCT Pub. No.: WO2016/000963
PCT Pub. Date: Jan. 7, 2016

(65) Prior Publication Data
US 2017/0163073 A1  Jun. 8, 2017

(30) Foreign Application Priority Data

Jun. 30, 2014 (EP) .................... 14174883

(51) Int. Cl.
*B60L 1/00* (2006.01)
*H02J 7/00* (2006.01)
(Continued)

(52) U.S. Cl.
CPC ............ *B60L 1/003* (2013.01); *B60L 50/66* (2019.02); *B60L 53/11* (2019.02); *B60L 53/12* (2019.02);
(Continued)

(58) Field of Classification Search
CPC .. B60R 11/04; B60R 2300/50; H02J 7/00036; H02J 7/0047; H02J 7/0027;
(Continued)

(56) References Cited

U.S. PATENT DOCUMENTS 5,003,236 A * 3/1991 Harless .................... B60K 1/04
318/139
8,428,802 B2 * 4/2013 Kizaki .................... B60K 6/32
701/22

(Continued)

FOREIGN PATENT DOCUMENTS

CN     201371765 Y    12/2009
CN     102591304 A     7/2012
(Continued)

OTHER PUBLICATIONS

International Search Report and Written Opinion of the International Searching Authority Application No. PCT/EP2015/063577 Completed: Jul. 1, 2015; dated Jul. 8, 2015 11 pages.

*Primary Examiner* — Frederick M Brushaber
(74) *Attorney, Agent, or Firm* — Whitmyer IP Group LLC

(57) ABSTRACT

An energy storage robot configured to be used to power electric underground equipment, the energy storage robot including a propulsion system being arranged to move the energy storage robot, an energy storage unit, a control unit being connected to the propulsion system and the energy storage unit. The energy storage unit is connectable to the electric underground equipment for powering the electric underground equipment and the control unit is arranged to communicate a level of energy of the energy storage unit to a coordinating module or another energy storage robot.

20 Claims, 7 Drawing Sheets

(51) Int. Cl.
    *H02J 7/02*         (2016.01)
    *B60L 53/16*       (2019.01)
    *B60L 53/30*       (2019.01)
    *B60L 58/12*       (2019.01)
    *B60L 50/60*       (2019.01)
    *B60L 53/80*       (2019.01)
    *B60L 53/36*       (2019.01)
    *B60L 53/10*       (2019.01)
    *H02J 50/40*      (2016.01)
    *H02J 50/10*      (2016.01)
    *H02J 50/80*      (2016.01)
    *B60L 53/12*       (2019.01)
    *B60L 53/38*       (2019.01)
    *B60L 58/30*       (2019.01)
    *B60R 11/04*      (2006.01)
    *G05D 1/00*        (2006.01)
    *G05D 1/02*        (2020.01)

(52) U.S. Cl.
    CPC .............. *B60L 53/16* (2019.02); *B60L 53/30* (2019.02); *B60L 53/36* (2019.02); *B60L 53/38* (2019.02); *B60L 53/80* (2019.02); *B60L 58/12* (2019.02); *B60L 58/30* (2019.02); *B60R 11/04* (2013.01); *G05D 1/0022* (2013.01); *G05D 1/0027* (2013.01); *G05D 1/0225* (2013.01); *G05D 1/0297* (2013.01); *H02J 7/0027* (2013.01); *H02J 7/00036* (2020.01); *H02J 7/0047* (2013.01); *H02J 7/02* (2013.01); *H02J 7/025* (2013.01); *H02J 50/10* (2016.02); *H02J 50/40* (2016.02); *H02J 50/80* (2016.02); *B60L 2200/40* (2013.01); *B60L 2240/547* (2013.01); *B60L 2240/549* (2013.01); *B60L 2240/627* (2013.01); *B60L 2240/70* (2013.01); *B60L 2240/72* (2013.01); *B60R 2300/50* (2013.01); *H02J 7/0048* (2020.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/40* (2013.01)

(58) Field of Classification Search
    CPC .... H02J 7/02; H02J 50/40; H02J 50/10; H02J 50/80; H02J 7/0048; H02J 7/00047; H02J 2310/40; H02J 7/025; B60L 1/003; B60L 53/16; B60L 53/11; B60L 53/30; B60L 53/12; B60L 58/12; B60L 53/38; B60L 50/66; B60L 58/30; B60L 53/36; B60L 53/80; B60L 2240/70; B60L 2240/547; B60L 2240/549; B60L 2240/72; B60L 2200/40; B60L 2240/627; G05D 1/0022; G05D 1/0027; G05D 1/0225; G05D 1/0297; Y02T 10/70; Y02T 10/72; Y02T 90/12; Y02T 90/40; Y02T 90/16; Y02T 90/14; Y02T 10/7072
    See application file for complete search history.

(56) References Cited

U.S. PATENT DOCUMENTS

| | | | |
|---|---|---|---|
| 9,722,442 B2 * | 8/2017 | Berry | H02J 7/342 |
| 9,969,283 B2 * | 5/2018 | Deahl | B60L 11/1822 |
| 2006/0061309 A1 * | 3/2006 | Rudinec | B60L 1/003 |
| | | | 318/139 |
| 2010/0148567 A1 * | 6/2010 | McClure | B60L 50/53 |
| | | | 299/64 |
| 2011/0025267 A1 | 2/2011 | Kamen et al. | |
| 2011/0106294 A1 | 5/2011 | Bebbington | |
| 2011/0224859 A1 * | 9/2011 | Pipponen | B60K 6/00 |
| | | | 701/22 |
| 2011/0301794 A1 * | 12/2011 | Bastien | E21F 17/06 |
| | | | 701/22 |
| 2012/0043172 A1 * | 2/2012 | Ichikawa | B60L 7/14 |
| | | | 191/45 R |
| 2012/0217074 A1 * | 8/2012 | Rudinec | B60L 50/60 |
| | | | 180/65.1 |
| 2012/0271758 A1 | 10/2012 | Jammer | |
| 2012/0298004 A1 * | 11/2012 | Osara | B60L 50/53 |
| | | | 102/313 |
| 2012/0303397 A1 * | 11/2012 | Prosser | B60L 53/00 |
| | | | 705/7.12 |
| 2013/0175819 A1 * | 7/2013 | Hindle | B62D 63/06 |
| | | | 296/24.3 |
| 2013/0220714 A1 * | 8/2013 | Rudinec | B60L 1/003 |
| | | | 180/65.1 |
| 2013/0313030 A1 | 11/2013 | Matsumura et al. | |
| 2014/0032006 A1 * | 1/2014 | Tojima | B60L 50/61 |
| | | | 700/295 |
| 2014/0088804 A1 | 3/2014 | Hyde et al. | |
| 2015/0071747 A1 * | 3/2015 | Deahl | B60L 53/80 |
| | | | 414/469 |

FOREIGN PATENT DOCUMENTS

| | | |
|---|---|---|
| EP | 2551145 A2 | 1/2013 |
| FR | 2974653 A1 | 11/2012 |
| JP | H06133411 A | 5/1994 |
| WO | 2006133074 A2 | 12/2006 |
| WO | 2011161471 A2 | 12/2011 |
| WO | 2012178010 A1 | 12/2012 |
| WO | 2013119942 A1 | 8/2013 |

* cited by examiner

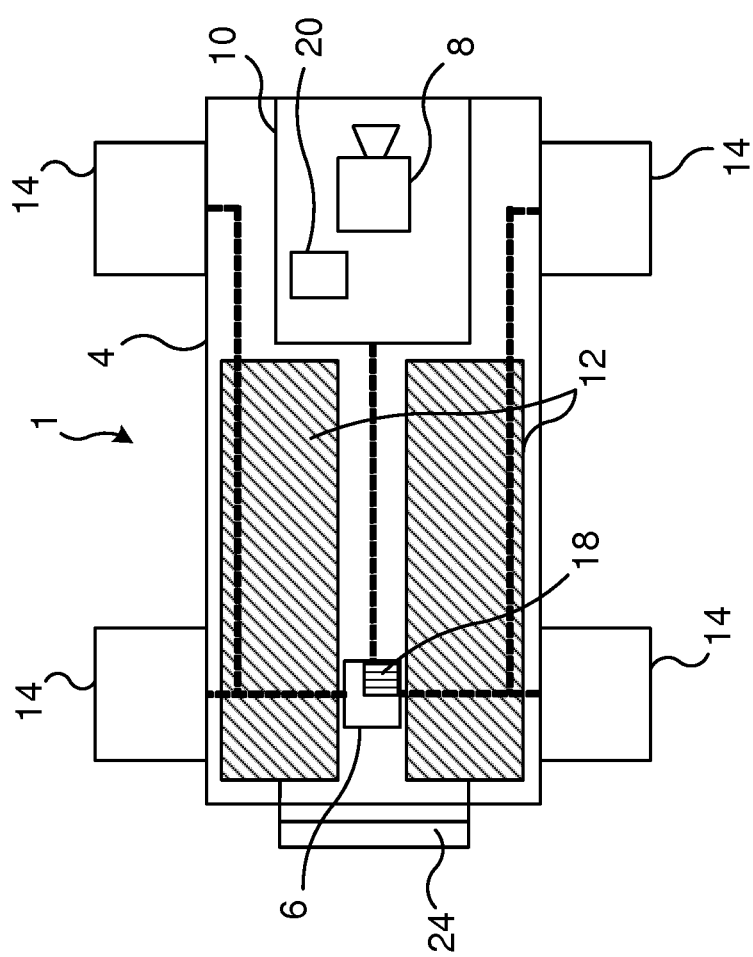
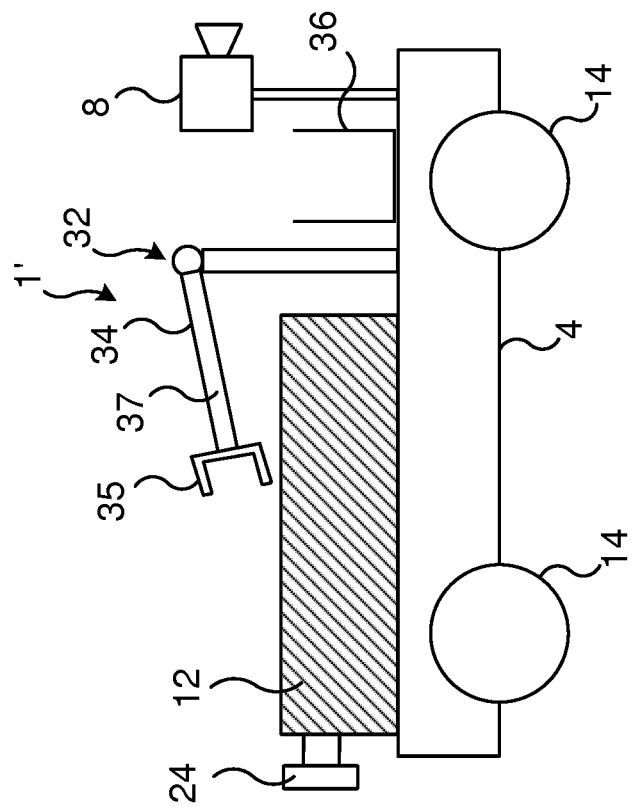
Fig. 1
Fig. 2

ENERGY STORAGE ROBOT

TECHNICAL FIELD

The invention relates to powering electric underground equipment.

BACKGROUND

Most of the underground equipment such as trucks, loaders, excavators, scrapers, concrete spraying machines and drilling machines used in tunnels and mines are up to today powered by diesel engines. Some drilling machines or drilling rigs are powered by electricity using cables to connect the drilling machines or rigs to a power source. When underground equipment with diesel engines is used in mines, caverns or tunnels, powerful ventilation needs to be installed, which is expensive to operate and time consuming to maintain.

In view of the above a trend to use electric underground equipment has been seen in the tunneling and mining industry. As described above it is possible to connect electric underground equipment by cables to a power source. This is however only suitable for machines having a long stationary period such as drilling rigs or in some cases concrete spraying machines. In addition having cables that carry a high voltage through the tunnels introduces additional risk, since the environment in the underground is quite harsh and heavy machinery is working in various positions.

In case of battery driven electric underground equipment reducing the downtime of the electric underground equipment during charging of the batteries is an issue, since electric underground equipment that is not producing still incurs costs while idle and does not add value. Electric underground equipment that is idle during the charging cannot be used, which may result in delays and unproductive waiting time of personnel and other underground equipment.

WO 2006133074 discloses an opportunity charging system for a battery powered, mobile mining machine. The charging systems uses inductive power transfer for transferring battery charging current produced by a rapid charging station to the battery of the machine. An alignment module of the charging station automatically aligns primary coils of the charging station with pick-up coils carried by the machine in response to detection of the presence of the machine at the charging station. The charging station is located along roadways of the mine normally travelled by production equipment. The inductive power transfer according to WO 2006133074 is intended to shorten the charging period, however the mining machine still needs to move to the charging station and stand idle during the actual charging, which results in a comparably long unproductive period.

SUMMARY

An object of the present invention is to provide an energy storage robot that further reduces downtime of electric underground equipment.

A further object of the present invention is to provide a method of powering electric underground equipment that enhances efficiency and reduces complexity.

The invention relates to an energy storage robot that is an energy storage in itself which is configured to power electric underground equipment. The energy storage robot may work together with other energy storage robots whereby the energy storage robots may be configured to communicate with each other so that the energy storage robot that is currently powering the electric underground equipment, can be replaced by an energy storage robot which is fully charged. The energy storage robot currently connected to the electric underground equipment can then disconnect itself from the equipment and move to a charging station. Depending on the distances between charging station and electric underground equipment, the amount of electric underground equipment and the charging time, the number of energy storage robots used may be adapted. The energy storage robot may be used for different types of electric equipment; the invention is however illustrated by means of electric underground equipment.

The energy storage may be an electrical energy storage in the form of a battery or a rechargeable battery.

Alternatively, the energy storage may be a fuel cell.

Disclosed herein is an energy storage robot configured to be used to power electric underground equipment. The energy storage robot comprises a propulsion system arranged to move the energy storage robot, an energy storage unit and a control unit being connected to the propulsion system and the energy storage unit. The energy storage unit is thereby connectable to the electric underground equipment for powering the electric underground equipment and the control unit is arranged to communicate a level of energy of the energy storage unit to a coordinating module or another energy storage robot.

The equipment does not necessarily need to be underground equipment it may alternatively be mining or construction equipment placed above ground.

Additionally the energy storage robot may comprise a main body.

The advantage of providing an energy storage robot of the above kind is that the energy storage of the electric underground equipment, which in fact is the energy storage robot, can be replaced anywhere in a short time, thus avoiding extended down time of the electric underground equipment.

In an embodiment of the invention the control unit may comprise a communication module, the communication module being arranged to communicate the level of energy of the energy storage unit to the coordinating module or the other energy storage robot.

The communication module may preferably be configured for wireless communication such as UWB, WLAN, Bluetooth, ZigBee, Laser, etc.

The other energy storage robot or the coordinating module, which may be in the form of a base station comprising a server, then makes sure that a replacement, in the form of another energy storage robot for the energy storage robot that is connected to the electric underground equipment, is available at the location of the electric underground equipment before the level of energy of the energy storage unit of the connected energy storage robot is not able to power the electric underground equipment any longer.

In a further embodiment of the invention the energy storage robot may comprise a navigating device, the navigating device being arranged to navigate the energy storage robot when it is moving.

The navigating device may be used to guide the energy storage robot around obstacles, to the electric underground equipment and to a charging station, respectively. The navigating device may further be used to guide the energy storage robot in the mine or tunnel.

The navigating device may comprise a 3D camera system connected to a processor or the like of the control unit. Alternatively the navigating device may be a laser device. The energy storage robot may further comprise a robot battery module connected to the propulsion system and the control unit, the robot battery module being arranged to power the energy storage robot.

Using a robot battery module may be advantageous in case the energy storage unit of the robot is depleted. In such a case the robot battery module may ensure that the energy storage robot can move itself to the charging station.

The robot battery may be a battery or alternatively a fuel cell.

In an embodiment according to the invention, the energy storage robot may comprise an attachment mechanism, which is arranged to mechanically connect the energy storage robot to the electric underground equipment.

The attachment mechanism may comprise means to lift and attach the energy storage robot to the electric underground equipment in a fixed manner.

The electric underground equipment may thus move as if the robot battery was only an energy storage, for example a battery and not an independent vehicle. The energy storage robot forms in such a case a fixed part of the electric underground equipment and the underground equipment does not have to manoeuvre as if there was a trailer in the form of the energy storage robot connected to it. This may be advantageous when excavators, loaders, trucks or scrapers need to be powered. These underground machines usually move while they are working while concrete spraying machines and drill rigs are operating at least part-time stationary.

The means to lift and attach the energy storage robot to the electric underground equipment may comprise a hydraulically or electrically powered mechanism.

In a further embodiment of the invention, the energy storage robot may comprise an interface, which is used to electrically connect the energy storage unit to the electric underground equipment.

The interface may comprise an inductive energy transfer system configured to supply energy from the energy storage unit to the electric underground equipment by induction.

Inductive energy transfer is comparably fast and efficient. Additionally there is no explicit physical connection required.

Alternatively, the interface may comprise a plug or socket configured to be connected to a socket or plug of the electric underground equipment in order to supply energy from the energy storage unit to the electric underground equipment.

Thus the energy storage unit may be connected to the electric underground equipment via a cable connection.

In another embodiment the energy storage robot may comprise a transport device configured to be used to transport material or goods such as tools, spare parts etc.

The transport device may comprise a container and a crane so that material and goods can be picked up, transported and placed down again.

A further aspect of the present invention concerns a robotic powering system comprising at least one robot charging station and at least two energy storage robots.

The energy storage robots may be of the above described kind and comprise all or some of the above features.

Disclosed herein is further a method of powering electric underground equipment comprising the steps of:
connecting an energy storage unit of a first energy storage robot to the electric underground equipment for powering the electric underground equipment;
dispatching a second energy storage robot with a charged energy storage unit to the electric underground equipment when a level of energy of the energy storage unit of the first energy storage robot reaches a predetermined threshold;
replacing the first energy storage robot with the second energy storage robot so that the second energy storage robot is powering the electric underground equipment.

The predetermined threshold may for example be 25% of the maximum amount of energy of the energy storage unit, 20% or 15%. In some cases a predetermined threshold of 10% may even apply.

Such a method allows operating the electric underground equipment essentially around the clock without extensive interruptions. The automatic replacement of the energy storage robots and thus of the energy storage units, significantly reduces down time and enhances efficiency.

The replacement of the first energy storage robot by the second energy storage robot may be done while the electric underground equipment is operating, for example by the aid of an internal electrical energy storage in the electric underground equipment or it may be done by switching the electric underground equipment temporarily off and replacing the first energy storage robot with the second energy storage robot. Such a replacement may take less than 5 minutes, preferably less than 3 minutes, more preferably less than 2 minutes.

In an embodiment of the invention the method may further comprise the step of navigating and moving the first energy storage robot to a robot charging station to charge the energy storage unit of the first energy storage robot, after it has been replaced by a second energy storage robot.

The first energy storage robot may thus be ready to replace another energy storage robot and to power another electric underground equipment as soon as the energy storage unit is charged.

In another embodiment according to the invention the method may comprise the step of establishing an electric connection between the electric underground equipment and the energy storage unit of the second robot, prior to replacing the first energy storage robot.

Thus, as previously mentioned, the electric underground equipment may run during the replacement of the first energy storage robot with the second energy storage robot.

The level of energy of the energy storage unit of the first energy storage robot may be communicated to a coordinating module or to the second energy storage robot.

The method according to the invention may further comprise the steps of:
dispatching a third energy storage robot with a charged energy storage unit to the electric underground equipment when a level of energy of the energy storage unit of the second energy storage robot reaches a predetermined threshold;
replacing the second energy storage robot with the third energy storage robot so that the third energy storage robot is powering the electric underground equipment; and
navigating the second energy storage robot to the robot charging station to charge the energy storage unit of the second energy storage robot.

Thus there may be a plurality of energy storage robots involved in the powering of the electric underground equipment to make sure that no machine or vehicle is left without power. The number of energy storage robots may vary from site to site.

The above described method may be performed by using at least two energy storage robots of the earlier described kind, the energy storage robots comprising some or all of the mentioned features.

Generally, all terms used in the claims are to be interpreted according to their ordinary meaning in the technical field, unless explicitly defined otherwise herein. All references to "a/an/the element, device, component, means, step, etc." are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 1 schematically illustrates a top down view onto an energy storage robot according to an embodiment of the invention with some parts being shown by illustrating a partially transparent main body;

FIG. 2 schematically illustrates a side view of another embodiment of the energy storage robot according to the invention;

DETAILED DESCRIPTION

Figure 3:
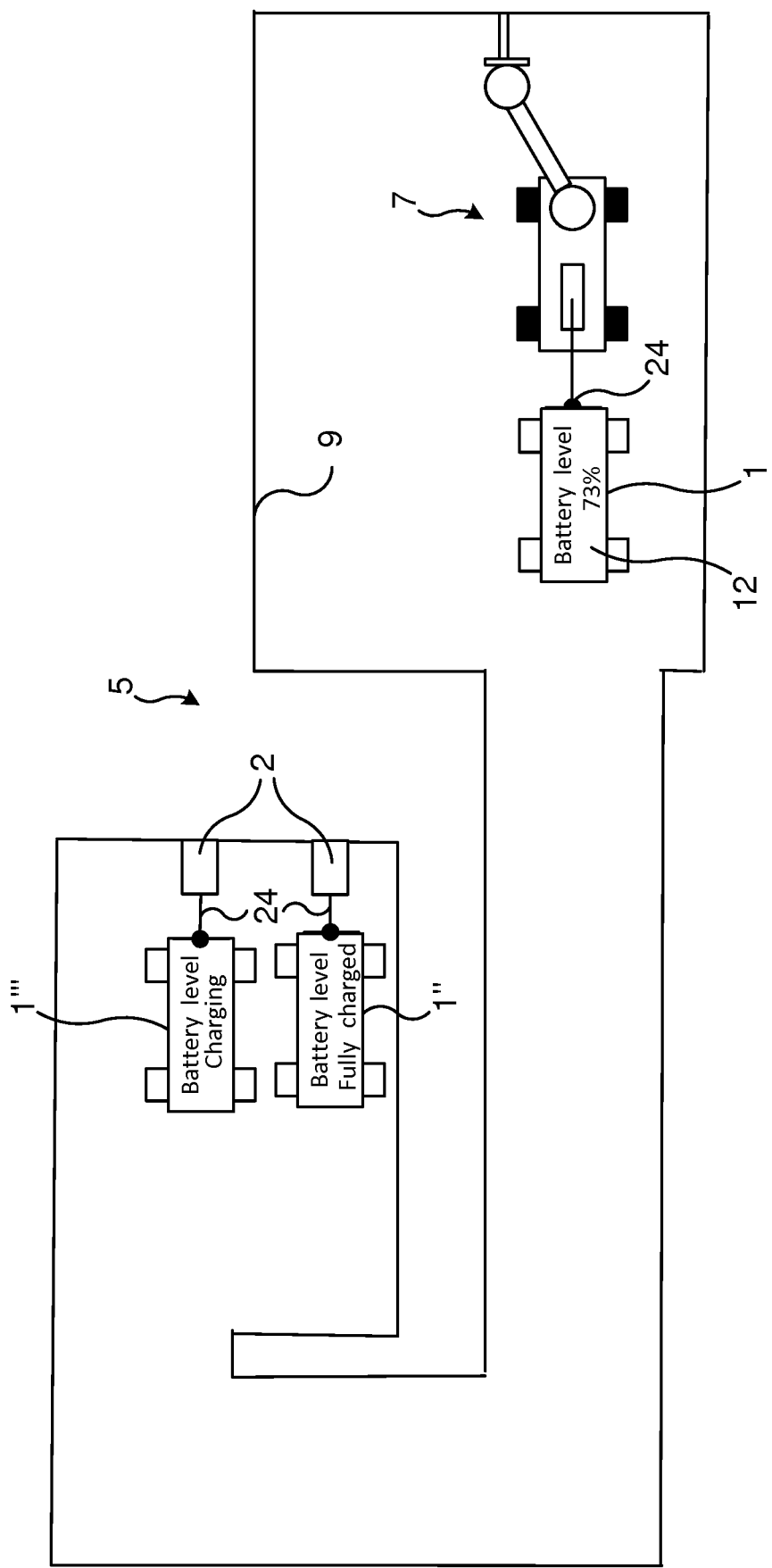
FIG. 3 schematically illustrates electric underground equipment, a first energy storage robot, a second energy storage robot and a third energy storage robot and how the energy storage robots may be used to power electric underground equipment.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 shows a top down view onto an example of an energy storage robot 1. The energy storage robot 1 comprises a main body 4, a propulsion system 6, a control unit 10 and an energy storage unit 12. In order to illustrate the various parts of the energy storage robot 1, the main body 4 is shown transparent. The various parts as described later herein, may however also be arranged on top of or around the main body 4.

As mentioned the energy storage may be an electrical energy storage in the form of a battery or a rechargeable battery.

Alternatively, the energy storage may be a fuel cell. The propulsion system 6 is arranged to drive the energy storage robot 1 via wheels 14, as shown in the illustrated example in FIG. 1. In another embodiment the energy storage robot may comprise another number of wheels 14. Some or all of the wheels 14 may be ground engaging means in the form of caterpillar tracks. The propulsion system 6 is connected to the control unit 10 and the wheels 14, as illustrated in FIG. 1. The propulsion system 6 may further comprise a robot battery module 18 that is used to power the energy storage robot 1. The robot battery module 18 is however optional since the power for the energy storage robot 1 itself may be drawn from the energy storage unit 12.

The energy storage unit 12 is connected to the control unit 10, for example via the propulsion system 6, as illustrated in FIG. 1. The energy storage unit 12 is divided into two energy storage packs, as shown in FIG. 1, and it is used to power electric underground equipment (not shown in FIG. 1). The energy storage unit 12 may comprise more than two energy storage packs or only one energy storage pack. The control unit 10 is configured to communicate with the energy storage unit 12 in order to obtain a level of energy of the energy storage unit 12.

The propulsion system 6 may be connected to the wheels 14 by way of a transmission or by an electric conductor. The connection between the propulsion system 6, the control unit 10, the energy storage unit 12 and the control unit 10 may be in the form of one or more electric conductors.

The control unit 10 comprises a navigating device 8 and a communication module 20. The navigating device 8 and the communication module 20 may however be arranged separately from the control unit 10. The communication module 20 and the navigating device 8 are connected to each other for communication and control. In the embodiment shown in FIG. 1, the navigating device 8 may for example be a 3D camera system. Alternatively the navigating device 8 may be an ultrasound-, an infrared or a laser navigating system. The communication module 20 is arranged to communicate with other vehicles and especially with other energy storage robots directly or indirectly (c.f. FIGS. 3 to 7) in order to organize the powering of electric underground equipment 7. A direct communication means that the energy storage robots 1, 1', 1", 1'" communicate with each other directly. An indirect communication means that the energy storage robots 1, 1', 1", 1'" communicate via a coordinating module 3 (c.f. FIG. 4) or some sort of a central communication unit of the mine or tunnel. The control unit 10 is further arranged to control and steer the propulsion system 6 so that the energy storage robot 1 can drive and move autonomously. The control unit 10 may comprise a plurality (not shown) of navigating devices 8, in order to ensure that the energy storage robot 1 can navigate and move in a safe manner.

Figure 4:
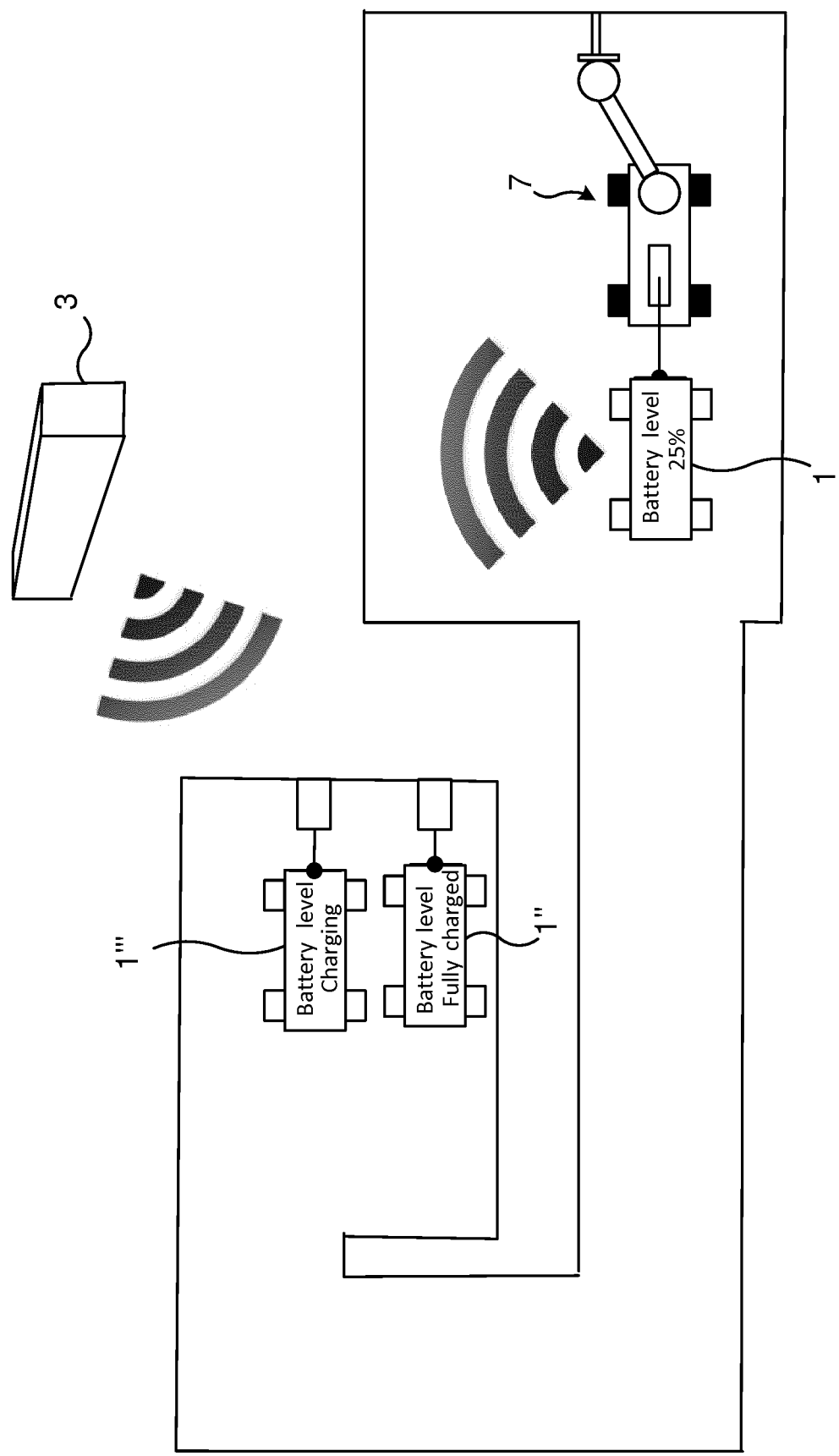
FIG. 4 illustrates a similar view as FIG. 3, whereby the communication between the energy storage robots is shown.

FIG. 1 further illustrates an interface 24, which is used to electrically connect the energy storage robot 1 to the electric underground equipment 7, shown in FIG. 3, and to supply energy from the energy storage unit 12 to the electric underground equipment 7. The interface 24 is connected the energy storage unit 12. In order to actually transfer the energy from the energy storage unit 12 to the electric underground equipment, the interface 24 may comprise a plug or socket which plug or socket is configured to be connected to a socket or plug of the electric underground equipment 7, for example with an additional cable or the like. Alternatively or additionally, the interface 24 may comprise an inductive energy transfer system having a coil, which coil is configured to interact with a coil of the electric underground equipment 7.

FIG. 2 schematically illustrates a side view of another embodiment of the battery robot 1'. The main body 4 is illustrated to carry the battery unit 12 and the navigating device 8. The navigating device 8 is mounted on a pole or the like, on the main body 4 for a good view. In order to provide for a good surround view around the battery robot 1', the navigating device 8 may be mounted by way of a moveable universal joint (not shown). In addition to the embodiment of the battery robot 1 shown in FIG. 1, the battery robot 1' illustrated in FIG. 2 comprises an attachment mechanism 32 and a transport device 36.

The attachment mechanism 32 may be used to physically or mechanically connect the battery robot 1' to the electric underground equipment 7, in order to avoid that the electric connection between the interface 24 and the electric underground equipment can break when the electric underground equipment 7 is operating. The attachment mechanism 32 may comprise means 34 to lift and attach the energy storage robot 1' to the electric underground equipment 7. The energy storage robot 1' may for instance be lifted and fixed onto a platform provided on the electric underground equipment 7. When the energy storage robot 1' is connected to the electric underground equipment 7, the equipment is not restricted in its movement. This may be especially beneficial if the electric underground equipment is a vehicle or the like, such as a mining truck, a loader, an excavator, etc.

The means 34 for lifting and attaching the energy storage robot 1' may be embodied in the form of a crane, or a hydraulic mechanism comprising a holding member 35 and an arm member 37, as illustrated in FIG. 2. Alternatively the means 34 may be embodied in the form of an electric mechanism.

Additionally, the battery robot 1' according to FIG. 2 comprises a transport device 36, which is illustrated in the form of a container. The transport device 36 may additionally comprise a crane (not shown) or the like to lift tools or spare parts into the container. Alternatively the means 34 for lifting and attaching the battery robot 1' to the electric underground equipment 7 may be used to lift tools and spare parts into and out of the container.

The transport device 36 may also be embodied or installed in the example of the battery robot 1 according to FIG. 1.

FIG. 3 illustrates a robotic powering system 5 in use in a mine or tunnel 9, the robotic powering system 5 comprising at least one robot charging station 2 and a plurality of energy storage robots 1, 1', 1'', 1'''. An electric underground equipment 7 in the form of a drill rig is shown at a tunnel face drilling holes into the tunnel face. A first energy storage robot 1 is powering the electric underground equipment 7 via the interface 24. The level of energy of the energy storage unit 12 of the first energy storage robot 1 is at 73%, according to the example in FIG. 3. Additionally, FIG. 3 illustrates a second energy storage robot 1'' and a third energy storage robot 1''' being charged at the robot charging stations 2. The second energy storage robot 1'' and the third energy storage robot 1''' are connected to the charging stations via the respective interfaces 24. As illustrated, the energy storage unit 12 of the second energy storage robot 1'' is fully charged. The third energy storage robot 1''' is charging.

There may be more robot charging stations 2, more energy storage robots 1, 1', 1'', 1''' and more electric underground equipment 7 operating in the tunnel or mine. The number of energy storage robots 1, 1', 1'', 1''', robot charging stations 2 depends on the distances between the electric underground equipment 7 and the robot charging stations, on the amount of electric underground equipment or vehicles operating in the mine/tunnel and on the charging time necessary to fully charge an energy storage unit 12.

When the energy storage unit 12 of the first energy storage robot 1 reaches a predetermined threshold, in the example in FIG. 4 illustrated with 25%, the first energy storage robot 1 communicates with the other energy storage robots 1'', 1'''. This may be done directly from energy storage robot to energy storage robot or via a coordinating module 3, for example in the form of a computer server, as shown in FIG. 4. The predetermined threshold may be lower or higher than 25% depending on the time a replacement energy storage robot 1'', 1''', in FIG. 4 the second or third energy storage robot 1'', 1''', needs to drive or move from the robot charging station 2 to the electric underground equipment 7. The coordinating module 3 will assign a fully charged energy storage robot 1'', in the illustrated situation the second energy storage robot 1'', with the task of replacing the first energy storage robot 1. Alternatively the energy storage robots 1, 1', 1'', 1''' may be configured to communicate directly among each other to organize a replacement energy storage robot 1'', 1''' so that no coordinating module 3 is needed.

Figure 5:
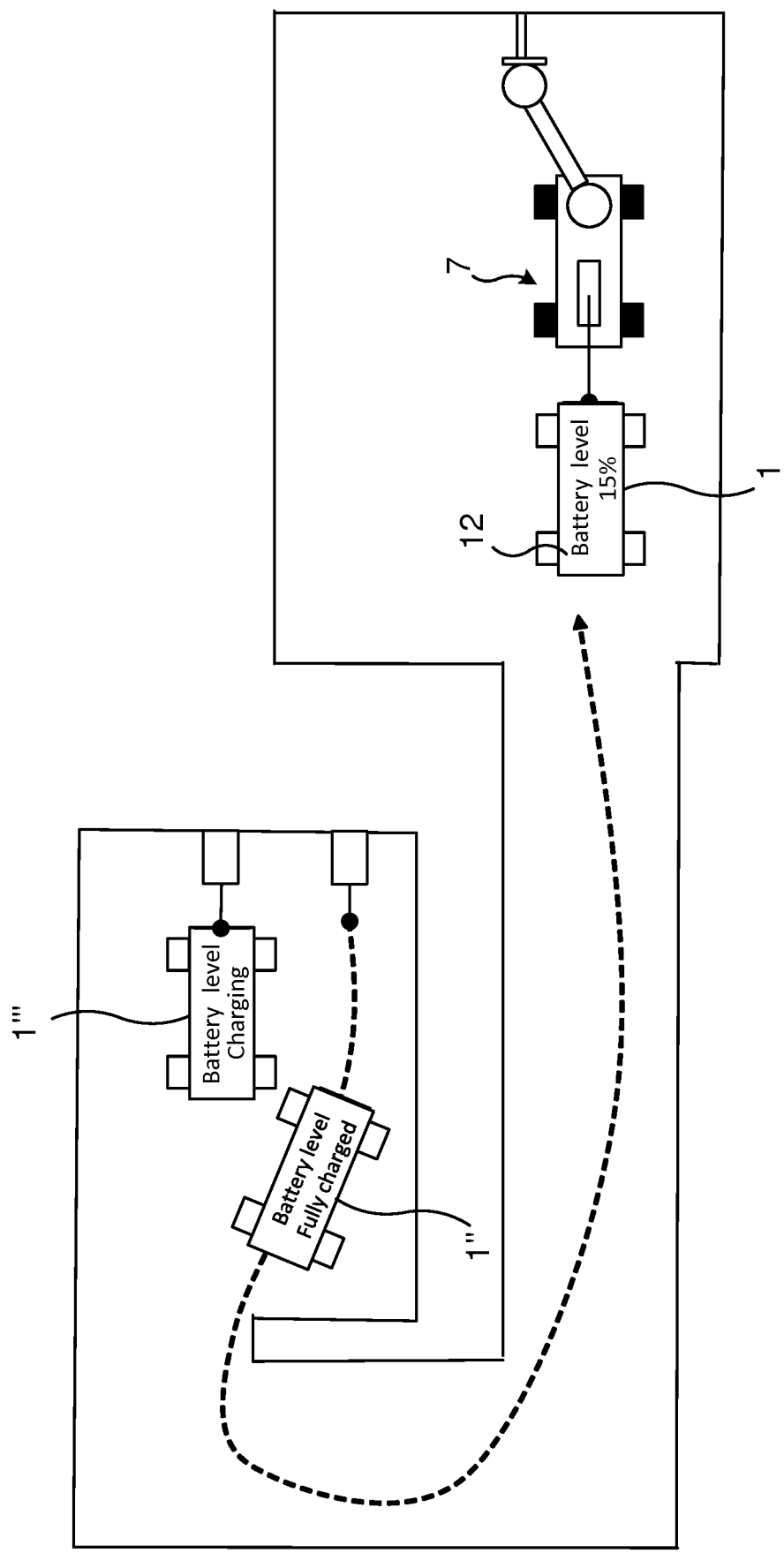
FIG. 5 illustrates a similar view as FIGS. 3 and 4, whereby a second energy storage robot is dispatched towards the electric underground equipment.

As soon as the second energy storage robot 1'' receives the signal that it is needed as a replacement, it disconnects from the robot charging station 2 and moves to the electric underground equipment 7, which is powered by the first energy storage robot 1, as shown in FIG. 5. By the time the second energy storage robot 1'' reaches the first energy storage robot 1, the energy storage unit 12 of the first energy storage robot 1 has already a lower level of energy than the predetermined threshold, in the illustrated situation 15%.

Figure 6:
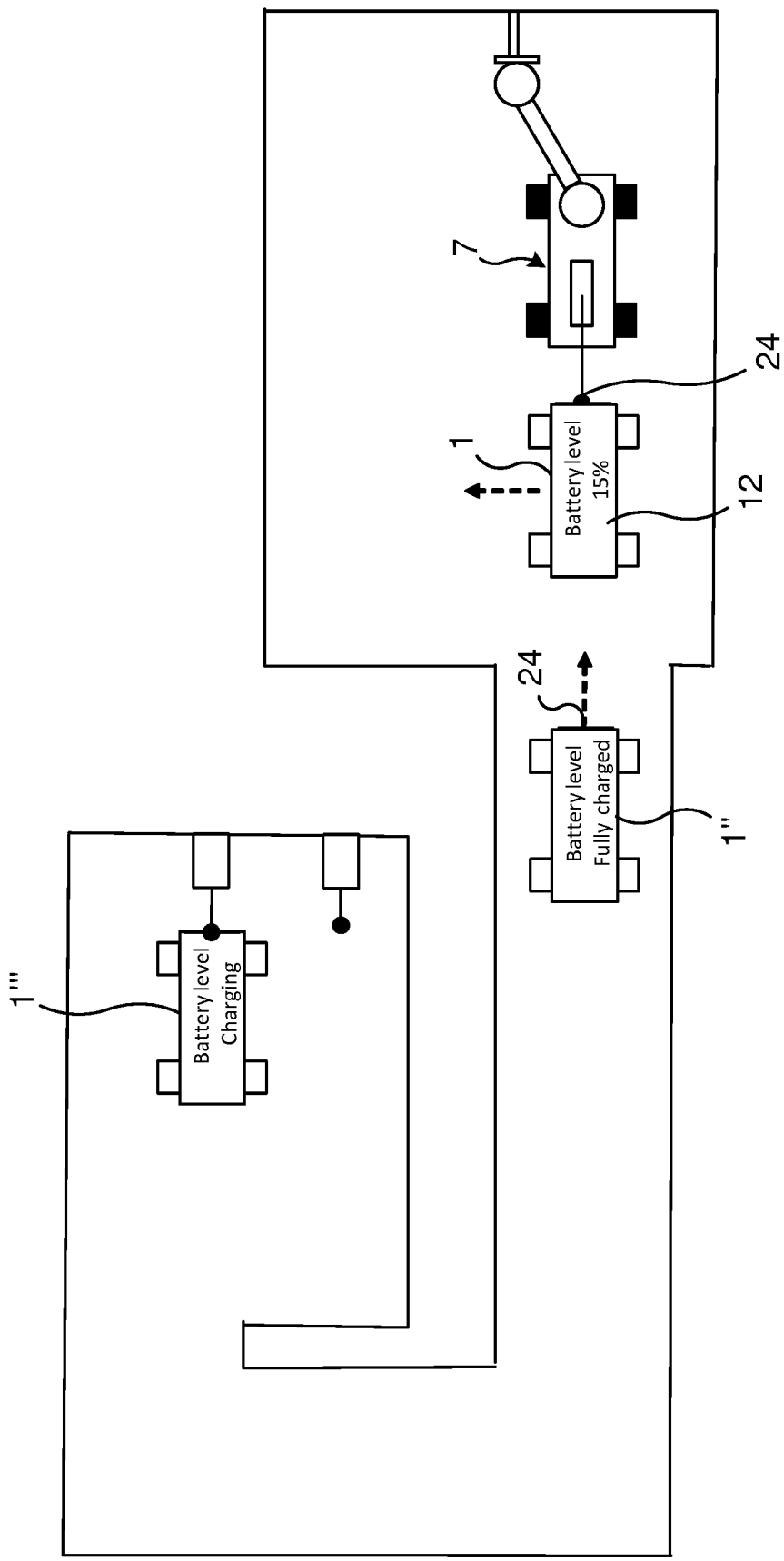
FIG. 6 illustrates a similar view as FIGS. 3 to 5, whereby the second energy storage robot is replacing the first energy storage robot.
Figure 7:
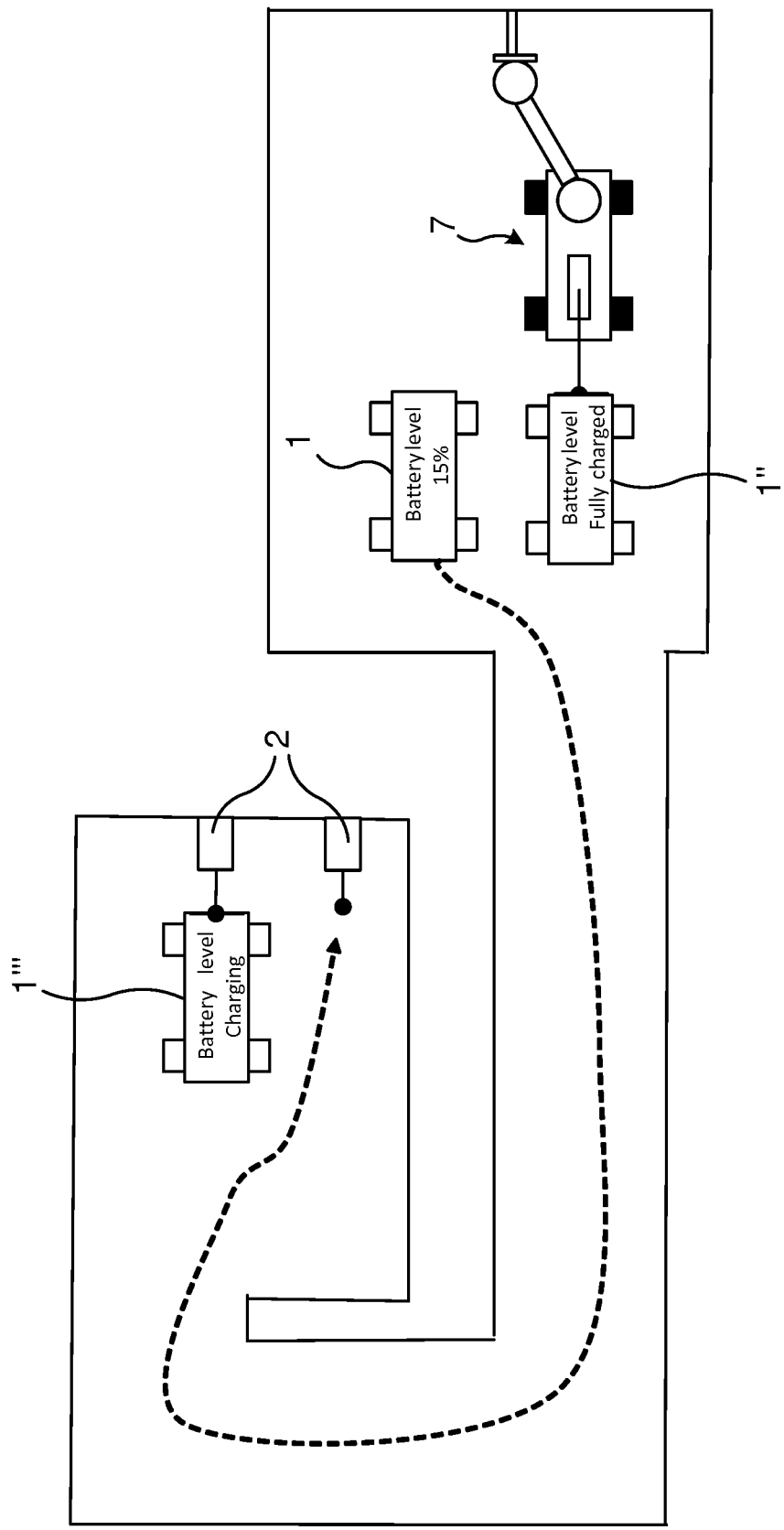
FIG. 7 illustrates a similar view as FIGS. 3 to 6, whereby the first energy storage robot is moving back to a charging station after the replacement.

FIGS. 6 and 7 illustrate how the first energy storage robot 1 is replaced by the second energy storage robot 1''. The replacement may be done by switching off the electric underground equipment 7 for a short time. After switching off the equipment 7, the first energy storage robot 1 disconnects its interface 24 from the electric underground equipment 7 and moves away from the electric underground equipment to make space for the second energy storage robot 1'', which is waiting nearby. As soon as the first energy storage robot 1 is out of the way, the second energy storage robot 1'' connects its interface 24 with the electric underground equipment 7. The electric underground equipment 7 is then ready to operate again. The whole replacement procedure may take less than 5 minutes, preferably less than 3 minutes, in the ideal case less than 2 minutes.

It is possible and falls within the scope of the invention to replace the first energy storage robot 1 with the second energy storage robot 1'' while the electric underground equipment 7 is operating. This may for example be achieved by an internal electrical energy storage in the electric underground equipment 7 that is configured to bridge the power supply while the first energy storage robot 1 is replaced by the second energy storage robot 1''.

Alternatively to the above, an inductive energy transfer system (not shown) may be used so that while the energy storage unit 12 of the first energy storage robot 1 is still connected to the electric underground equipment 7, via a coil (not shown) in the interface 24 and a coil (not shown) in the electric underground equipment 7, the energy storage unit 12 of the second energy storage robot 1'' may be connected via its coil to the coil of the electric underground equipment 7 so that the energy storage unit 12 of the first energy storage robot 1 and the energy storage unit 12 of the second energy storage robot 1'' are powering the electric underground equipment 7 for a short time. As soon as the energy storage unit 12 of the second energy storage robot 1'' is connected to the electric underground equipment 7, the energy storage unit 12 of the first energy storage robot 1 may be disconnected from the electric underground equipment 7. Thus the electric underground equipment 7 is not switched off during the whole replacement process. The described inductive energy transfer system may require optimized space conditions at the energy storage robots 1, 1", 1'" and at the electric underground equipment 7, so that two energy storage robots 1, 1" can be connected simultaneously to the electric underground equipment 7 for a short time.

FIG. 7 illustrates how the second energy storage robot 1" is now powering the electric underground equipment 7, while the first energy storage robot 1 is moving back to a free dock of the robot charging station 2.

As soon as another energy storage robot (not shown), which is powering electric underground equipment, requires to be replaced, the third energy storage robot 1'" will be dispatched.

Figure 8:
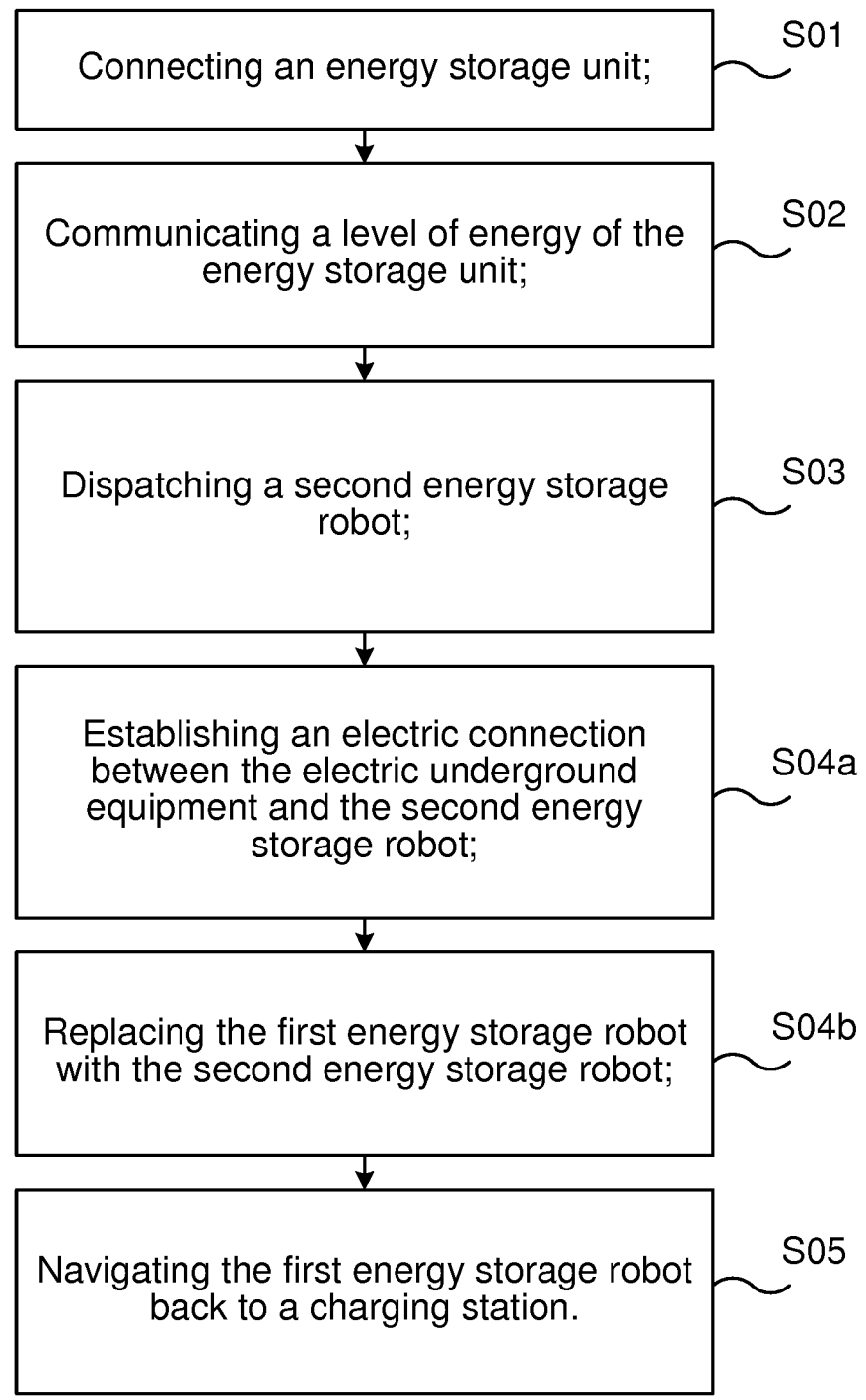
FIG. 8 illustrates a flowchart according to a method of the present invention.

FIG. 8 illustrates method steps according to a method of powering electric underground equipment 7 via energy storage robots 1, 1', 1", 1'".

The method may also be performed with an energy storage robot 1, 1', 1", 1'" according to any of the above described kind or any variation thereof.

The method comprises the steps of:

S01. A first energy storage robot 1 connects its energy storage unit 12 to the electric underground equipment 7 for powering the electric underground equipment.

S02. The first energy storage robot 1 communicates the level of energy of the energy storage unit 12 of the first energy storage robot 1 to a coordinating module 3 or to the second energy storage robot 1".

This may be done directly or indirectly, as described above. The energy storage robots 1", 1'", which are charging their energy storage units 12 are thus aware of the current status of the first energy storage robot 1.

S03. As soon as a replacement energy storage robot 1", 1'" is required, thus as soon as a level of energy of the energy storage unit 12 of the first energy storage robot reaches a predetermined threshold, a second energy storage robot 1" with a charged energy storage unit 12 will be dispatched to the electric underground equipment 7.

The energy storage robots 1, 1', 1", 1'" communicate among each other so that an energy storage robot 1", 1'" with a fully charged energy storage unit 12 is dispatched.

S04*a*. In an example of the invention the second energy storage robot 1" may establish an electric connection between the electric underground equipment and the energy storage unit of the second energy storage robot 1", prior to replacing the first energy storage robot 1.

The electric underground equipment 7 may thus not need to be switched off during the replacement procedure.

S04 The first energy storage robot may be replaced with the second energy storage robot so that the second energy storage robot is powering the electric underground equipment.

This may done by switching the electric underground equipment 7 temporarily off for a short time. Alternatively the replacement may be done while the electric underground equipment is running, as described in the above step S04*a*.

S05. After the second energy storage robot 1" is connected to the electric underground equipment 7, the first energy storage robot may move back to a robot charging station 2 to charge its energy storage unit 12.

In the above described method not each and every method step needs to be performed to provide a method of powering electric underground equipment 7 according to the example. The steps of communicating S02 the level of energy and or establishing S04*a* an electric connection prior to replacement of the first energy storage robot 1 with the second energy storage robot 1" may not be necessary.

When the energy storage unit 12 of the second energy storage robot 1" reaches the predetermined threshold of for example 25%, 20%, 15% or 10%, the following steps may be performed:

dispatching a third energy storage robot 1'" with a charged energy storage unit 12 to the electric underground equipment when a level of energy of the energy storage unit 12 of the second energy storage robot reaches the predetermined threshold;

replacing the second energy storage robot with the third energy storage robot so that the third energy storage robot is powering the electric underground equipment; and navigating the second energy storage robot to the robot charging station 2 to charge the energy storage unit of the second energy storage robot.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An energy storage robot configured to be used to power electric underground equipment, the energy storage robot comprising:
   a propulsion system being arranged to move the energy storage robot;
   an energy storage unit, which is connectable to the electric underground equipment for powering the electric underground equipment; and
   a control unit being connected to the propulsion system and the energy storage unit, the control unit communicating a level of energy of the energy storage unit to a coordinating module or another energy storage robot; and
   a main body, wherein the propulsion system, the energy storage unit, and the control unit are attached to the main body;
   wherein the energy storage robot attaches the main body to the electric underground equipment when the energy storage unit is powering the electric underground equipment so that the main body forms a fixed part of the electric underground equipment and moves with the electric underground equipment as the electric underground equipment manoeuvres during operation.

2. The energy storage robot according to claim 1, wherein the control unit comprises a communication module, the communication module being arranged to communicate the level of energy of the energy storage unit to the coordinating module or the other energy storage robot.

3. The energy storage robot according to claim 2, wherein the control unit comprises a navigating device, the navigating device being arranged to navigate the energy storage robot when it is moving.

4. The energy storage robot according to claim 1, wherein the control unit comprises a navigating device, the navigating device being arranged to navigate the energy storage robot when it is moving.

5. The energy storage robot according to claim 1, comprising a robot battery module connected to the propulsion system and the control unit, the robot battery module being arranged to power the energy storage robot.

6. The energy storage robot according to claim 1, wherein the energy storage is used to power the energy storage robot.

7. The energy storage robot according to claim 1, comprising an attachment mechanism, wherein the attachment mechanism is arranged to mechanically connect the energy storage robot to the electric underground equipment.

8. The energy storage robot according to claim 7, wherein the attachment mechanism comprises means to lift and attach the energy storage robot to the electric underground equipment in a fixed manner.

9. The energy storage robot according to claim 1, comprising an interface, which is used to electrically connect the energy storage unit to the electric underground equipment.

10. The energy storage robot according to claim 9, wherein the interface comprises an inductive energy transfer system configured to supply energy from the energy storage unit to the electric underground equipment by induction.

11. The energy storage robot according to claim 9, wherein the interface comprises a plug or socket configured to be connected to a socket or plug of the electric underground equipment in order to supply energy from the energy storage unit to the electric underground equipment.

12. The energy storage robot according to claim 1 comprising a transport device configured to be used to transport material or goods.

13. The energy storage robot according to claim 1, wherein the energy storage robot is configured to attach to the electric underground equipment such that the energy storage robot is movable with the electric underground equipment during operation of the electric underground equipment.

14. A powering system comprising:
   at least one robot charging station; and
   at least two energy storage robots, each energy storage robot includes:
      a propulsion system being arranged to move the energy storage robot;
      an energy storage unit, which is connectable to the electric underground equipment for powering the electric underground equipment;
      a control unit being connected to the propulsion system and the energy storage unit, the control unit communicating a level of energy of the energy storage unit to a coordinating module or another energy storage robot; and
      a main body, wherein the propulsion system, the energy storage unit, and the control unit are attached to the main body;
   wherein each energy storage robot attaches the respective main body to the electric underground equipment when the energy storage unit is powering the electric underground equipment so that the respective main body forms a fixed part of the electric underground equipment and moves with the electric underground equipment as the electric underground equipment manoeuvres during operation.

15. A method of powering electric underground equipment comprising the steps of:
   connecting an energy storage unit of a first energy storage robot to the electric underground equipment for powering the electric underground equipment, wherein the energy storage unit is attached to a main body of the first energy storage robot, and wherein the first energy storage robot attaches the main body to the electric underground equipment when the energy storage unit is powering the electric underground equipment so that the main body forms a fixed part of the electric underground equipment and moves with the electric underground equipment as the electric underground equipment manoeuvres during operation;
   dispatching a second energy storage robot with a charged energy storage unit to the electric underground equipment when a level of energy of the energy storage unit of the first energy storage robot reaches a predetermined threshold, the level of energy being obtained by a control unit attached to the main body of the first energy storage robot; and
   replacing the first energy storage robot with the second energy storage robot so that the charged energy storage unit of the second energy storage robot is powering the electric underground equipment, wherein the charged energy storage unit remains attached to a main body of the second energy storage robot when powering the electric underground equipment.

16. The method according to claim 15, comprising the step of navigating the first energy storage robot to a robot charging station to charge the energy storage unit of the first energy storage robot.

17. The method according to claim 16, comprising the step of establishing an electric connection between the electric underground equipment and the energy storage unit of the second energy storage robot, prior to replacing the first energy storage robot.

18. The method according to claim 15, comprising the step of establishing an electric connection between the electric underground equipment and the energy storage unit of the second energy storage robot, prior to replacing the first energy storage robot.

19. The method according to claim 15, comprising the step of communicating the level of energy of the energy storage unit of the first energy storage robot to a coordinating module or to the second energy storage robot.

20. The method according to claim 15, comprising the steps of:
   dispatching a third energy storage robot with a charged energy storage unit to the electric underground equipment when a level of energy of the energy storage unit of the second energy storage robot reaches a predetermined threshold;
   replacing the second energy storage robot with the third energy storage robot so that the third energy storage robot is powering the electric underground equipment; and
   navigating the second energy storage robot to the robot charging station to charge the energy storage unit of the second energy storage robot.

* * * * *